United States Patent
Wei et al.

(10) Patent No.: US 11,153,870 B2
(45) Date of Patent: *Oct. 19, 2021

(54) PUCCH RESOURCE MAPPING AND HARQ-ACK FEEDBACK

(71) Applicant: QUALCOMM Incorporated, San Diego, CA (US)

(72) Inventors: Chao Wei, Beijing (CN); Wanshi Chen, San Diego, CA (US); Xiaoxia Zhang, San Diego, CA (US); Neng Wang, Lund (SE); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,860

(22) Filed: Aug. 6, 2018

(65) Prior Publication Data
US 2018/0359750 A1  Dec. 13, 2018

Related U.S. Application Data

(63) Continuation of application No. 14/910,567, filed as application No. PCT/CN2014/082389 on Jul. 17, 2014, now Pat. No. 10,045,339.

(51) Int. Cl.
*H04W 52/14* (2009.01)
*H04W 72/04* (2009.01)
(Continued)

(52) U.S. Cl.
CPC ....... *H04W 72/0446* (2013.01); *H04L 1/0073* (2013.01); *H04L 1/1812* (2013.01);
(Continued)

(58) Field of Classification Search
None
See application file for complete search history.

(56) References Cited

U.S. PATENT DOCUMENTS

2011/0274063 A1  11/2011  Li
2013/0077514 A1   3/2013  Dinan
(Continued)

FOREIGN PATENT DOCUMENTS

CN    101489255 A    7/2009
CN    101674164 A    3/2010
(Continued)

OTHER PUBLICATIONS

Huawei, Hisilicon: "PUSCH A/N Codebook Size and RE Determination for TDD", 3GPP TSG-RAN WG1#65 R1-111243, May 3, 2011, 16 Pages, URL:http://www.3gpp.org/ftp/tsg_ran/WG1_RL1/TSGR1_65/Docs/R1-111243.zip.
(Continued)

*Primary Examiner* — Brandon M Renner

(57) ABSTRACT

Aspects of the present disclosure relate to techniques that may help enable the determination of uplink resource allocation in systems that support dynamic uplink-downlink subframe configurations. An example method generally includes receiving signaling indicating a dynamic uplink-downlink (UL-DL) subframe configuration, determining hybrid automatic repeat request (HARQ) acknowledgment/negative acknowledgment (ACK/NACK) timing based on a reference UL-DL subframe configuration, and determining HARQ resource allocation based on the dynamic UL-DL subframe configuration.

25 Claims, 9 Drawing Sheets

700

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

(51) Int. Cl.
*H04L 1/18* (2006.01)
*H04L 1/00* (2006.01)
*H04L 5/00* (2006.01)
*H04W 52/04* (2009.01)

(52) U.S. Cl.
CPC .......... *H04L 1/1854* (2013.01); *H04L 1/1861* (2013.01); *H04L 5/0055* (2013.01); *H04W 52/04* (2013.01); *H04W 72/0406* (2013.01); *H04W 72/04* (2013.01)

(56) References Cited

U.S. PATENT DOCUMENTS

| | | |
|---|---|---|
| 2013/0194980 A1 | 8/2013 | Yin et al. |
| 2013/0301490 A1 | 11/2013 | He et al. |
| 2014/0050107 A1 | 2/2014 | Charbit et al. |
| 2014/0269539 A1 | 9/2014 | Yin et al. |
| 2014/0301394 A1* | 10/2014 | Arad .................. H04L 45/7453 370/392 |
| 2014/0334351 A1 | 11/2014 | Yin et al. |
| 2014/0334457 A1 | 11/2014 | Tiirola et al. |
| 2015/0023228 A1 | 1/2015 | Yin et al. |
| 2015/0043391 A1 | 2/2015 | Yin et al. |
| 2015/0049654 A1* | 2/2015 | Pan ........................ H04L 5/14 370/280 |
| 2015/0085712 A1* | 3/2015 | Wang ....................... H04L 1/00 370/280 |
| 2015/0195063 A1* | 7/2015 | Ro ........................ H04L 5/0042 370/329 |
| 2015/0236824 A1 | 8/2015 | Lei et al. |
| 2015/0244485 A1 | 8/2015 | Nguyen et al. |
| 2015/0358138 A1 | 12/2015 | Hwang et al. |
| 2016/0112960 A1* | 4/2016 | Park ...................... H04L 5/0048 370/329 |
| 2016/0183308 A1 | 6/2016 | Eriksson et al. |
| 2016/0192354 A1 | 6/2016 | Wei et al. |
| 2018/0159666 A1 | 6/2018 | Oizumi et al. |

FOREIGN PATENT DOCUMENTS

| | | |
|---|---|---|
| WO | 2011163470 A1 | 12/2011 |
| WO | 2012035712 A1 | 3/2012 |
| WO | 2012106840 A1 | 8/2012 |
| WO | 2013070837 A1 | 5/2013 |
| WO | 2013166689 A1 | 11/2013 |
| WO | 2014047860 A1 | 4/2014 |

OTHER PUBLICATIONS

Mediatek Inc., "Discussion on HARQ-ACK resource in TDD eIMTA", 3GPP TSG-RAN WG1#74 R1-133282, Aug. 10, 2013, 5 Pages, URL:http://www.3gpp.org/ftp/tsg_ran/WG1_RL1/TSGR1_74/Docs/R1-133282.zip.
Renesas Mobile Europe LTD: "HARQ Aspects in TDD eIMTA", 3GPP TSG-RAN WG1#74 R1-133242, Aug. 9, 2013, 5 Pages, URL:http://www.3gpp.org/ftp/tsg_ran/WG1_RL1/TSGR1_74/Docs/R1-133242.zip.
Samsung: "Signaling for TDD UL-DL Reconfiguration", 3GPP TSG-RAN WG1#74 R1-133094, Aug. 10, 2013, 6 Pages, URL:http://www.3gpp.org/ftp/tsg_ran/WG1_RL1/TSGR1_74/Docs/R1-133094.zip.
Intel Corporation: "HARQ Aspect for TDD eIMTA", R1-132927, 3GPP TSG RAN WG1 #74, 3GPP Server Publication Date (Aug. 10, 2013), 4 pages.
NEC Group: "Backward Compatibility for TDD eIMTA System", R1-132333, 3GPP TSG RAN WG1 #73, 3GPP Server Publication Date (May 11, 2013), 3 pages.
NSN, et al., On HARQ Timing for TDD eIMTA, R1-133477, 3GPP TSG RAN WG1 #74, 3GPP Server Publication Date (Aug. 10, 2013), 4 pages.
Texas Instruments: "TDD Dynamic Pucch Resource Allocation for EPDCCH", R1-130095, 3GPP TSG RAN WG1 #72, 3GPP Server Publication Date (Jan. 19, 2013), 5 pages.
3GPP: "Samsung on PDSCH HARQ transmission" 3GPP TSG RAN WG1 #74 R1-133095, pp. 1-4, Aug. 10, 2013 (Aug. 10, 2013).
European Search Report—EP14837949—Search Authority—The Hauge—dated Feb. 17, 2017.
International Search Report and Written Opinion—PCT/CN2014/082389—ISA/EPO—dated Oct. 22, 2014.
International Search Report and Written Opinion—PCT/CN2013/081961—ISA/EPO—dated Jun. 5, 2015.
ITRI: "HARQ Feedback Issue in TDD eIMTA System", 3GPP Draft, R1-132253, 3rd Generation Partnership Project (3GPP), Mobile Competence Centre, 650, Route Des Lucioles, F-06921, Sophia Antipolis Cedex, France, vol. RAN WG1, No. Fukuoka, Japan, May 11, 2013, XP050698025, Retrieved from the Internet: URL: http://www.3gpp.org/ftp/tsg_ran/WG1_RL1/TSGR1_73/Docs/R1-132253.zip.
LG Electronics: "Details of UL-DL Reconfiguration Message", 3GPP Draft, R1-133366, 3rd Generation Partnership Project (3gpp), Mobile Competence Centre, 650, Route Des Lucioles, F-06921, Sophia-Antipolis Cedex, France, vol. RAN WG1, No. Barcelona, Spain, Aug. 10, 2013, XP050716480, Retrieved from the Internet: http://www.3gpp.org/ftp/tsg_ran/WG1_RL1/TSGR1_74/Docs/R1-133366.zip.
NEC Group: "Reconfiguration Signaling for eIMTA System", 3GPP Draft, R1-133338, 3rd Generation Partnership Project (3gpp), Mobile Competence Centre, 650, Route Des Lucioles, F-06921, Sophia-Antipolis Cedex, France, vol. RAN WG1, No. Barcelona, Spain, Aug. 10, 2013, XP050716458, Retrieved from the Internet: http://www.3gpp.org/ftp/tsg_ran/WG1_RL1/TSGR1_74/Docs/R1-133338.zip.

* cited by examiner

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

| Reference TDD UL-DL configuration | Candidate TDD UL-DL configuration set | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 (DSUDDDSUDD) | 0 | - | - | 7, 6 | - | - | - | - | 7, 6 | - | - |
| | 1 | - | - | 8, 7, 6 | - | - | - | - | 8, 7, 6 | - | - |
| | 2 | - | - | 8, 7, 4, 6 | - | - | - | - | 8, 7, 4, 6 | - | - |
| | 6 | - | - | 7, 6 | - | - | - | - | 8, 7, 6 | - | - |
| 4 (DSUUDDDDDD) | 0 | - | - | 12, 7, 11 | 7 | - | - | - | - | - | - |
| | 1 | - | - | 12, 8, 7, 11 | 4, 7 | - | - | - | - | - | - |
| | 3 | - | - | 12, 7, 11 | 6, 5, 4, 7 | - | - | - | - | - | - |
| | 4 | - | - | 12, 8, 7, 11 | 6, 5, 4, 7 | - | - | - | - | - | - |
| | 6 | - | - | 12, 7, 11 | 4, 7 | - | - | - | - | - | - |
| 5 (DSUDDDDDDD) | 0 | - | - | 12, 7, 11, 6 | - | - | - | - | - | - | - |
| | 1 | - | - | 13, 12, 8, 7, 11, 6 | - | - | - | - | - | - | - |
| | 2 | - | - | 13, 12, 9, 8, 7, 4, 11, 6 | - | - | - | - | - | - | - |
| | 3 | - | - | 13, 12, 7, 5, 4, 11, 6 | - | - | - | - | - | - | - |
| | 4 | - | - | 13, 12, 7, 5, 4, 11, 6 | - | - | - | - | - | - | - |
| | 5 | - | - | 13, 12, 9, 8, 7, 5, 4, 11, 6 | - | - | - | - | - | - | - |
| | 6 | - | - | 13, 12, 7, 11, 6 | - | - | - | - | - | - | - |

FIG. 10

PUCCH RESOURCE MAPPING AND HARQ-ACK FEEDBACK

CROSS-REFERENCE TO RELATED APPLICATIONS

This application is a continuation of U.S. patent application Ser. No. 14/910,567, filed Feb. 5, 2016, which is a 35 U.S.C. § 371 national phase entry of PCT Application No. PCT/CN2014/082389, entitled "PUCCH Resource Mapping and HARQ-ACK Feedback," filed Jul. 17, 2014, which claims benefit of PCT Application No. PCT/CN2013/081961, entitled "PUCCH Resource Mapping and HARQ-ACK Feedback," filed Aug. 21, 2013, each of which is assigned to the assignee hereof. The contents of each of the aforementioned applications are herein incorporated by reference in their entireties.

TECHNICAL FIELD

Certain aspects of the present disclosure generally relate to wireless communications and, more particularly, to techniques for resource allocation in systems that utilize dynamic subframe configuration.

BACKGROUND

Wireless communication systems are widely deployed to provide various types of communication content, such as voice and data, to wireless devices. These systems may be multiple-access systems capable of supporting simultaneous communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication with multiple wireless terminals. Each terminal communicates with one or more base stations via transmissions on the forward and reverse links. The forward link (or downlink) refers to the communication link from the base stations to the wireless terminals, and the reverse link (or uplink) refers to the communication link from the wireless terminals to the base stations. This communication link may be established via a single-in-single-out, multiple-in-single-out or a multiple-in-multiple-out (MIMO) system.

SUMMARY

Certain aspects of the present disclosure provide a method for wireless communication by a user equipment (hereinafter "UE"). The method generally includes receiving signaling indicating a dynamic uplink-downlink (hereinafter "UL-DL") subframe configuration, determining hybrid automatic repeat request (hereinafter "HARQ") acknowledgement/negative acknowledgement (hereinafter "ACK/NACK") timing based on a reference UL-DL subframe configuration, and determining HARQ resource allocation based on the dynamic UL-DL subframe configuration.

Certain aspects of the present disclosure provide a method for wireless communication by a base station (hereinafter "BS"). The method generally includes transmitting, to a UE, signaling indicating a dynamic UL-DL subframe configuration, determining HARQ ACK/NACK timing for the UE based on a reference UL-DL subframe configuration, and determining HARQ resource allocation for the UE based on the dynamic UL-DL subframe configuration.

Certain aspects of the present disclosure also provide various apparatus and program products for performing operations of the methods described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10 illustrates an example downlink associate sets, in accordance with aspects of the present disclosure, according to aspects of the present disclosure.

DESCRIPTION

Figure 1:
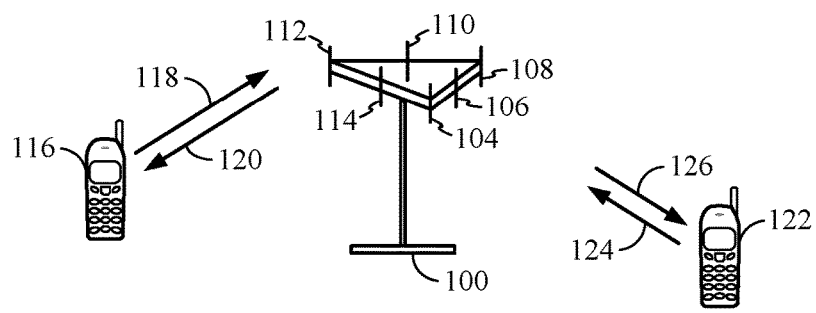
FIG. 1 illustrates a multiple access wireless communication system, according to aspects of the present disclosure.

Enhanced interference mitigation and traffic adaptation (hereinafter "eIMTA") allows for dynamic adaptation of UL-DL subframe configurations based on actual traffic needs. Using a reference configuration for eIMTA may result in inefficiencies in resource allocation and collisions between resources assigned for use by legacy UEs and eIMTA UEs. Aspects of the present disclosure provide what may be considered a hybrid design of reference UL-DL subframe configurations and dynamic UL-DL subframe configurations, determined by a UE, which may allow for a reduction in inefficiencies in resource allocation and collisions between resources assigned for use by legacy UEs and eIMTA UEs.

According to certain aspects provided herein, UEs are able to determine uplink resource allocation in systems where a dynamic UL-DL subframe configuration is supported.

The detailed description set forth below, in connection with the appended drawings, is intended as a description of various configurations and is not intended to represent the only configurations in which the aspects described herein may be practiced. The detailed description includes specific details for the purpose of providing a thorough understanding of the various aspects set forth herein. However, it will be apparent to those skilled in the art that these concepts may be practiced without these specific details. In some instances, well-known structures and components are shown in block diagram form in order to avoid obscuring such aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR) protocols. CDMA2000 includes the IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used throughout much of the description below.

Single carrier frequency division multiple access (SC-FDMA), which utilizes single carrier modulation and frequency domain equalization, is a technique for enabling multiple access communications. SC-FDMA has similar performance and essentially the same overall complexity as that of an OFDMA system. An SC-FDMA signal has lower peak-to-average power ratio (PAPR) because of its inherent single carrier structure. SC-FDMA has drawn great attention, especially for uplink communications where lower PAPR greatly benefits the mobile terminal in terms of transmit power efficiency. It is currently a working assumption for use in the uplink multiple access scheme in 3GPP Long Term Evolution (LTE), or Evolved UTRA.

FIG. 1 illustrates an example multiple access wireless communication system, in which aspects of the present disclosure may be practiced. For example, BS 100 may be configured to perform or direct operations 1200 in FIG. 12 to use a hybrid design of reference UL-DL subframe configurations and dynamic UL-DL subframe configurations to determine a HARQ ACK/NACK timing and HARQ resource allocation for a connected access terminal and/or other processes for the techniques described herein. Similarly, UEs 116 and 122 may be configured to perform or direct operations 1100 in FIG. 11 to use a hybrid design of reference UL-DL subframe configurations and dynamic UL-DL subframe configurations to determine a HARQ ACK/NACK timing and HARQ resource allocation for the UE and/or other processes for the techniques described herein.

As shown, BS 100 includes multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. UE 116 is shown in communication with antennas 112 and 114, where antennas 112 and 114 transmit information to access terminal 116 over a forward link 120 and receive information from access terminal 116 over a reverse link 118. UE 122 is shown in communication with antennas 106 and 108, where antennas 106 and 108 transmit information to access terminal 122 over a forward link 126 and receive information from access terminal 122 over a reverse link 124. In an FDD system, communication links 118, 120, 124 and 126 may use different frequencies for communication with an UE; for example, forward link 120 may communicate with a UE using a different frequency than that used by reverse link 118 to communicate with the same UE.

Each group of antennas, and/or the area in which they are designed to communicate, is often referred to as a sector of the access point. In the embodiment, antenna groups are each designed to communicate to the ATs in a sector, of the areas covered by an access point 100.

When in communication with a UE 116 or 122 over forward links 120 and 126, the transmitting antennas of BS 100 utilize beamforming in order to improve the signal-to-noise ratio of the forward links for communication with the different access terminals 116 and 122. Also, a BS using beamforming to transmit signals to access terminals scattered randomly through the BS's coverage area causes less interference to UEs in neighboring cells than a BS transmitting through a single antenna to all its access terminals.

As used herein, the term BS generally refers to a fixed or mobile station used for communicating with the terminals and may also be referred to as an access point, a Node B, evolved Node B (eNB) or some other terminology. A UE may also be called an access terminal, a wireless communication device, terminal, mobile station or some other terminology.

Figure 2:
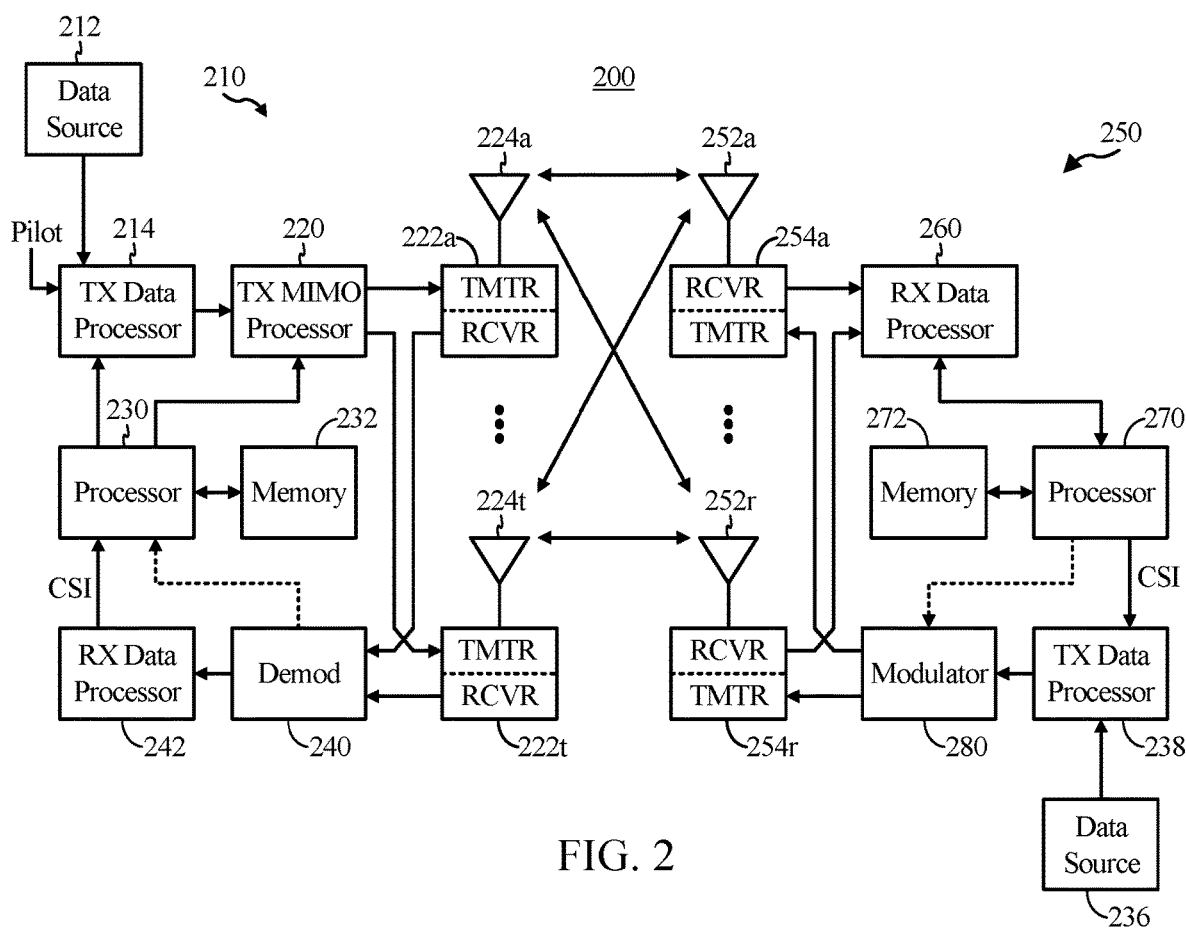
FIG. 2 is a block diagram of a communication system, according to aspects of the present disclosure.

FIG. 2 is a block diagram of an embodiment of a BS, such as transmitter system 210, and a UE, such as receiver system 250, in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream using a particular coding scheme selected for that data stream to provide coded data.

The coded data for each data stream may be multiplexed with pilot data using OFDM techniques. The pilot data is typically a known data pattern that is processed in a known manner and may be used at the receiver system 250 to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions, stored in memory 232, and generation of modulation symbols based on the determined data rate, coding, and modulation for the data streams may be performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. TX data processor 238 may process the reverse link message (and other traffic data for a number of data streams from a data source 236). The processed reverse link message may be modulated by a modulator 280, conditioned by transmitters 254a through 254r, and transmitted back to transmitter system 210.

At transmitter system 210, the modulated signals received from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights to use for communicating with receiver system 250 and then processes the extracted message.

According to aspects, the controllers/processors 230 and 270 may direct the operation at the transmitter system 210 and/or the receiver system 250, respectively, to perform various techniques described herein. For example, the controller/processor 230, TX data processor 214, and/or other processors and modules at the transmitter system 210 may perform or direct operations 1200 in FIG. 12 to use a hybrid design of reference UL-DL subframe configurations and dynamic UL-DL subframe configurations to determine a HARQ ACK/NACK timing and HARQ resource allocation for a connected receiver system 250 and/or other processes for the techniques described herein. According to another aspect, the controller/processor 270, RX processor 260, and/or other processors and modules at the receiver system 250 may perform or direct operations 1100 in FIG. 11 to use a hybrid design of reference UL-DL subframe configurations and dynamic UL-DL subframe configurations to determine a HARQ ACK/NACK timing and HARQ resource allocation for the receiver system 250 and/or other processes for the techniques described herein. However, any other processor or component in FIG. 2 may perform or direct operations 1100 in FIG. 11, operations 1200 in FIG. 12 and/or other processes for the techniques described herein. The memories 232 and 272 may store data and program codes for the transmitter system 210 and the receiver system 250, respectively.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing a Radio Resource Control (hereinafter "RRC") connection, this channel is only used by UEs that receive MBMS (i.e., old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block In addition, Rel-12 refers to Release 12 of the LTE standard.

Figure 3:
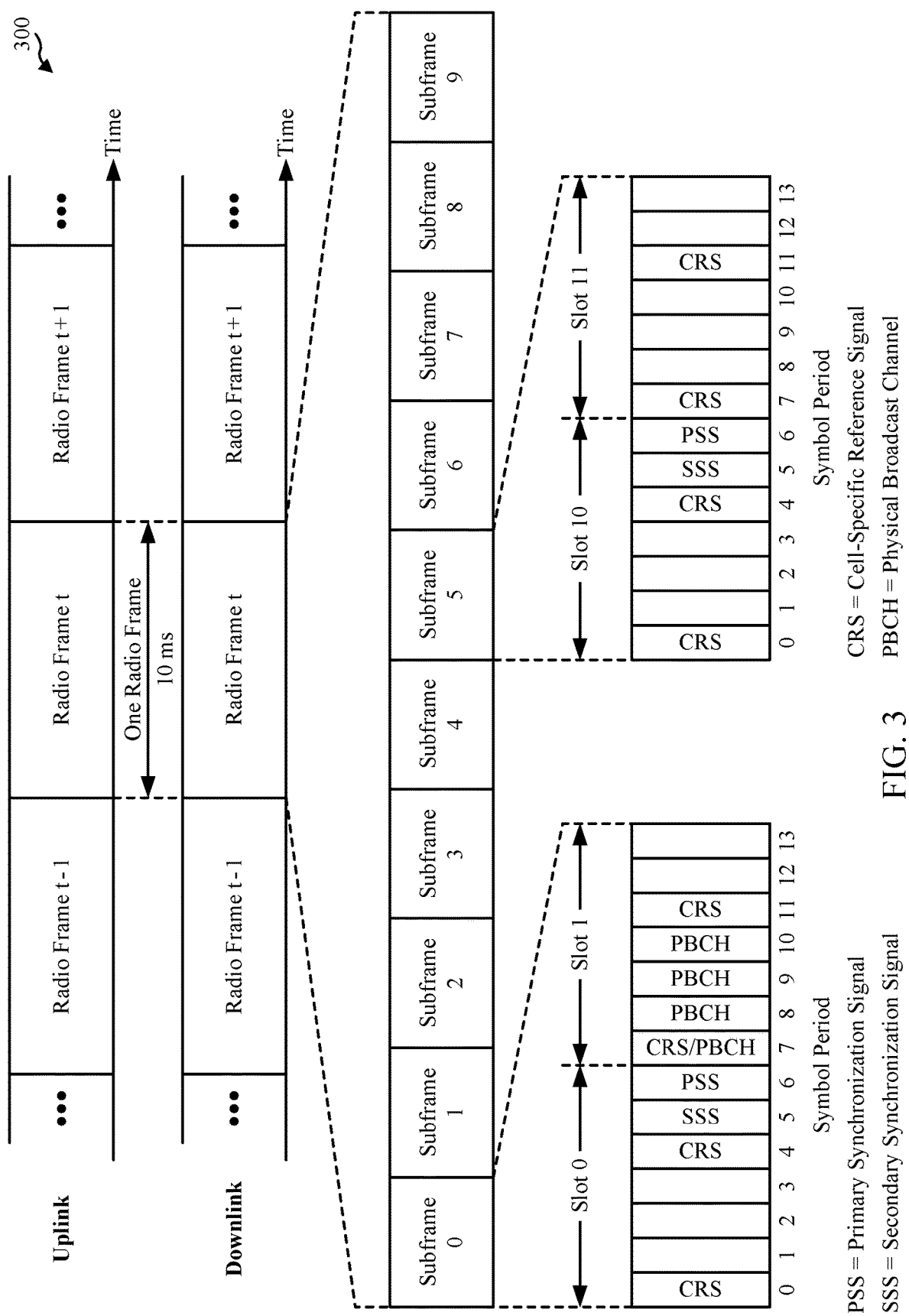
FIG. 3 illustrates an example frame structure, according to aspects of the present disclosure.

FIG. 3 shows an exemplary frame structure 300 for FDD in LTE. The transmission timeline for each of the downlink transmissions and uplink transmissions may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1, where in FIG. 3, L is 7.

In LTE, an eNB may transmit a primary synchronization signal (PSS) and a secondary synchronization signal (SSS) on the downlink in the center 1.08 MHz frequency band of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
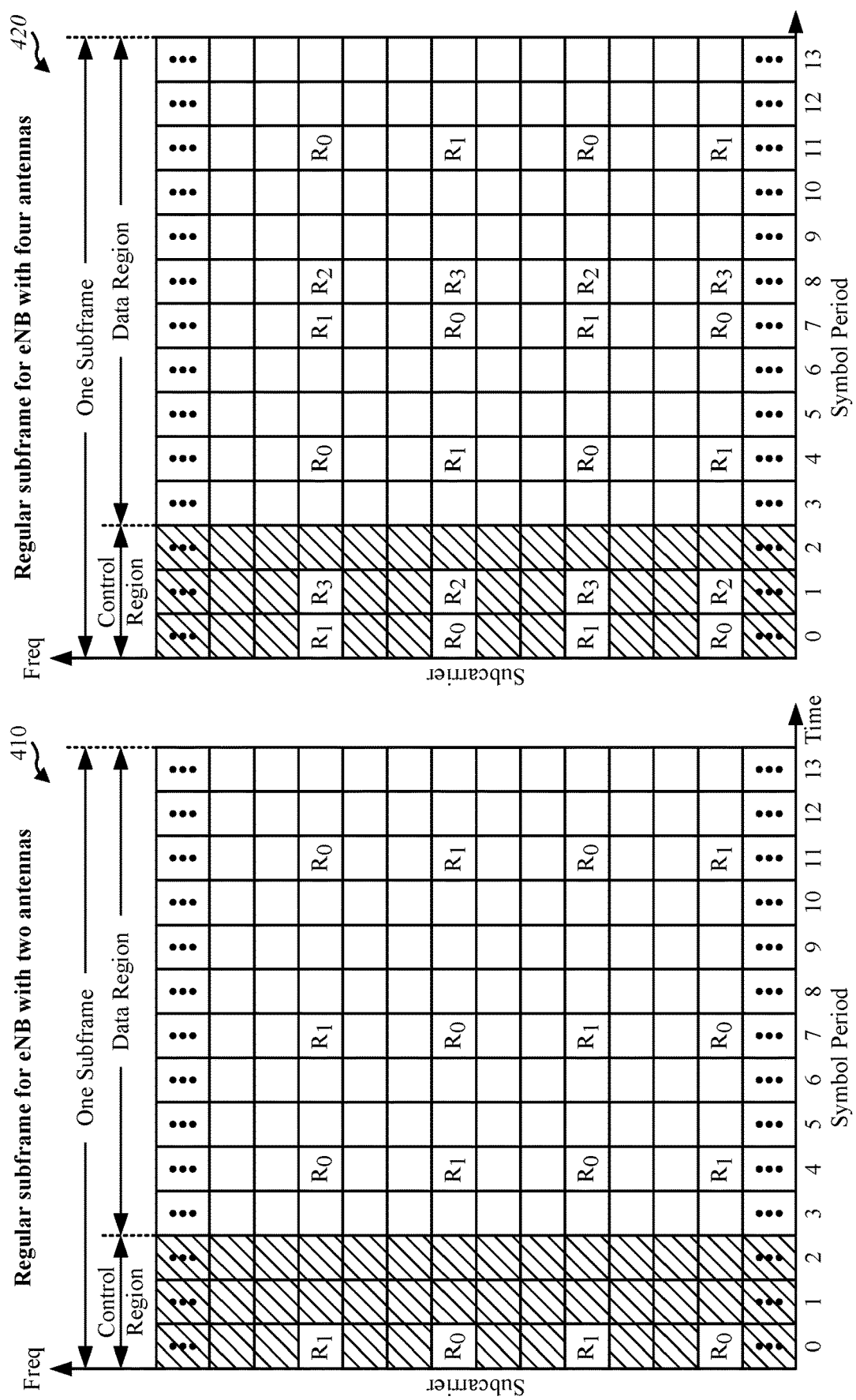
FIG. 4 illustrates an example subframe resource element mapping, according to aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example eIMTA

Aspects of the present disclosure may be utilized in enhanced interference management and traffic adaptation (eIMTA) systems, in which uplink-downlink (UL-DL) subframe configurations may be dynamically switched (e.g., based on changing UL/DL loads).

Figure 5:
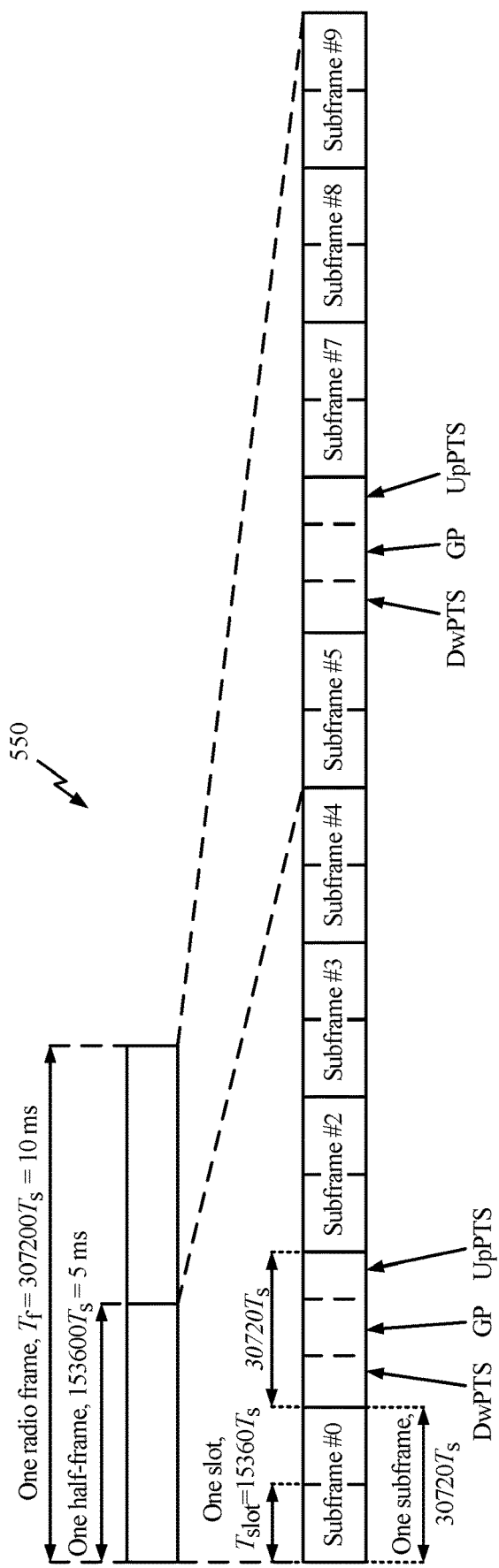
FIG. 5 illustrates an example set of subframe configurations and example special subframe formats, with which aspects of the present disclosure may be practiced.

In LTE, both frequency division duplex (FDD) and time division duplex (TDD) frame structures are supported. For TDD, 7 possible DL and UL subframe configurations are supported in LTE, as illustrated in table 500 of FIG. 5. As illustrated, there are 2 switching periodicities, 5 ms and 10 ms. For subframe configurations with 5 ms switching periodicity, there are two special subframes in one (10 ms) frame, as shown in diagram 550 of FIG. 5. For subframe configurations with 10 ms switching periodicity, there is one special subframe in each frame.

As noted above, utilizing eIMTA (such as provided in LTE Rel-12), it is possible to dynamically adapt TDD DL/UL subframe configurations based on actual traffic needs. For example, if during a short duration, a large data burst on the downlink is needed, the subframe configuration can be changed to one with more DL subframes, for example, from config #1 (6 DL:4 UL) to config #5 (9 DL:1 UL).

The adaptation of TDD configuration is expected to be no slower than 640 ms. In the extreme case, the adaptation may be as fast as 10 ms, although this may not be desirable. In any case, the adaptation may cause overwhelming interference to both downlink and uplink when two or more cells have different downlink and uplink subframes.

The adaptation may also cause some complexity in DL and UL HARQ timing management. Conventionally, each of the seven DL/UL subframe configurations has its own DL/UL HRQ timing that is optimized for each configuration (in terms of HARQ operation efficiency). For example, the timing from PDSCH to the corresponding ACK/NAK may be different for different TDD DL/UL subframe configurations (e.g., depending on when a next available UL subframe occurs).

Dynamic switching among the 7 configurations (or even more, if more flexible adaptation is deemed as necessary) implies that if current DL/UL HARQ timing is kept, there may be missed ACK/NAK transmission opportunities for some of the DL or UL transmissions.

To simplify the operations for eIMTA, it is possible to define one or more DL/UL configurations as a reference for many physical layer operations. As an example, DL HARQ operations may be based on DL/UL subframe configuration #5 as a reference configuration, regardless of the actual DL/UL subframe configuration in use in a particular frame (or half a frame).

Figures 6, 7:
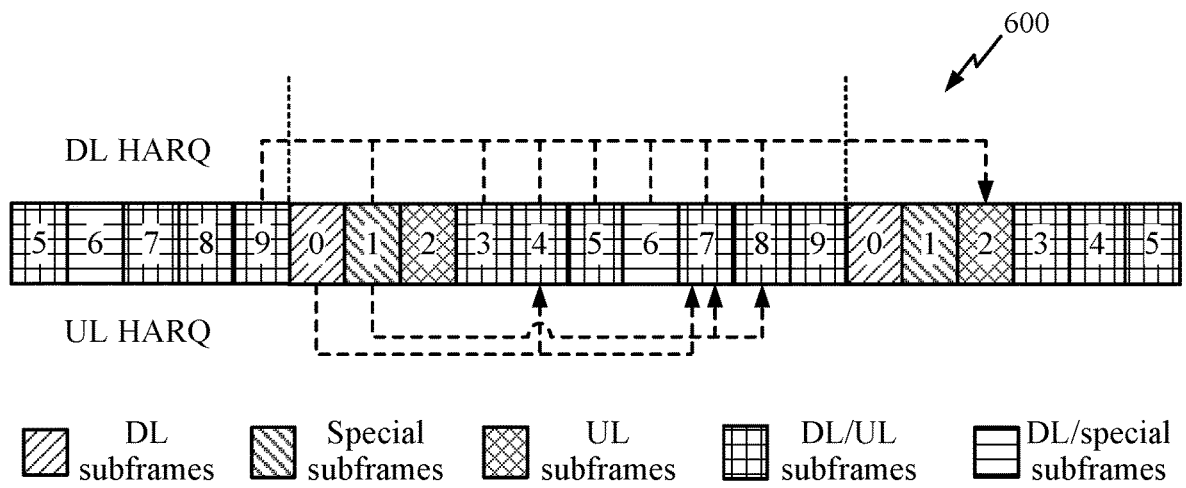
FIG. 6 illustrates an example use of a reference subframe configuration, according to aspects of the present disclosure.
FIG. 7 illustrates example downlink association sets, according to aspects of the present disclosure.

In other words, if dynamic DL/UL subframe configuration is enabled, the DL HARQ timing can be always based on the 9:1 DL/UL subframe configuration (of configuration #5 as a reference). At the same time, UL HARQ operation may be based on DL/UL subframe configuration #0, regardless of the actual DL/UL subframe configuration in use in a frame (or half a frame). That is, if dynamic DL/UL subframe configuration is enabled, the UL HARQ timing can be always based on the 4:6 DL/UL subframe configuration (of configuration #0). This is illustrated in FIG. 6, which shows the reference configuration for DL HARQ timing based on configuration #5 by the dashed lines on the top, while the UL HARQ timing based on configuration #0 is shown by the dashed lines on the bottom. As shown in FIG. 6, the actual usage of a subframe can be subject to eNB scheduling. For example subframes 3/4/5/7/8/9 can be either DL or UL subframes, while subframe 6 can be either a DL or special subframe.

In some cases, PUCCH resource allocation may be implicitly determined. For example, for PUCCH format 1a/1b/1b with channel selection, the PUCCH resource may be implicitly determined by the first control channel element (CCE)/enhanced control channel element (ECCE) index of PDCCH/EPDCCH. The block interleaved mapping may also be used, for example, when the HARQ-ACK of multiple DL subframes is fed back in a single UL subframe. The downlink associate set may be dependent on TDD UL-DL configuration. The PUCCH resource associated with a single DL subframe may be determined as:

$$n_{PUCCH}^{(1)} = n_{CCE} + n_{PUCCH}^{(1)}$$

The PUCCH resource associated with multiple DL subframes may be determined as:

$$n_{PUCCH,j}^{(1)} = (M-m-1)*N_c + m*N_c + m*N_{c+1} + n_{CCE,m} + N_{PUCCH}^{(1)}$$

Figure 8:
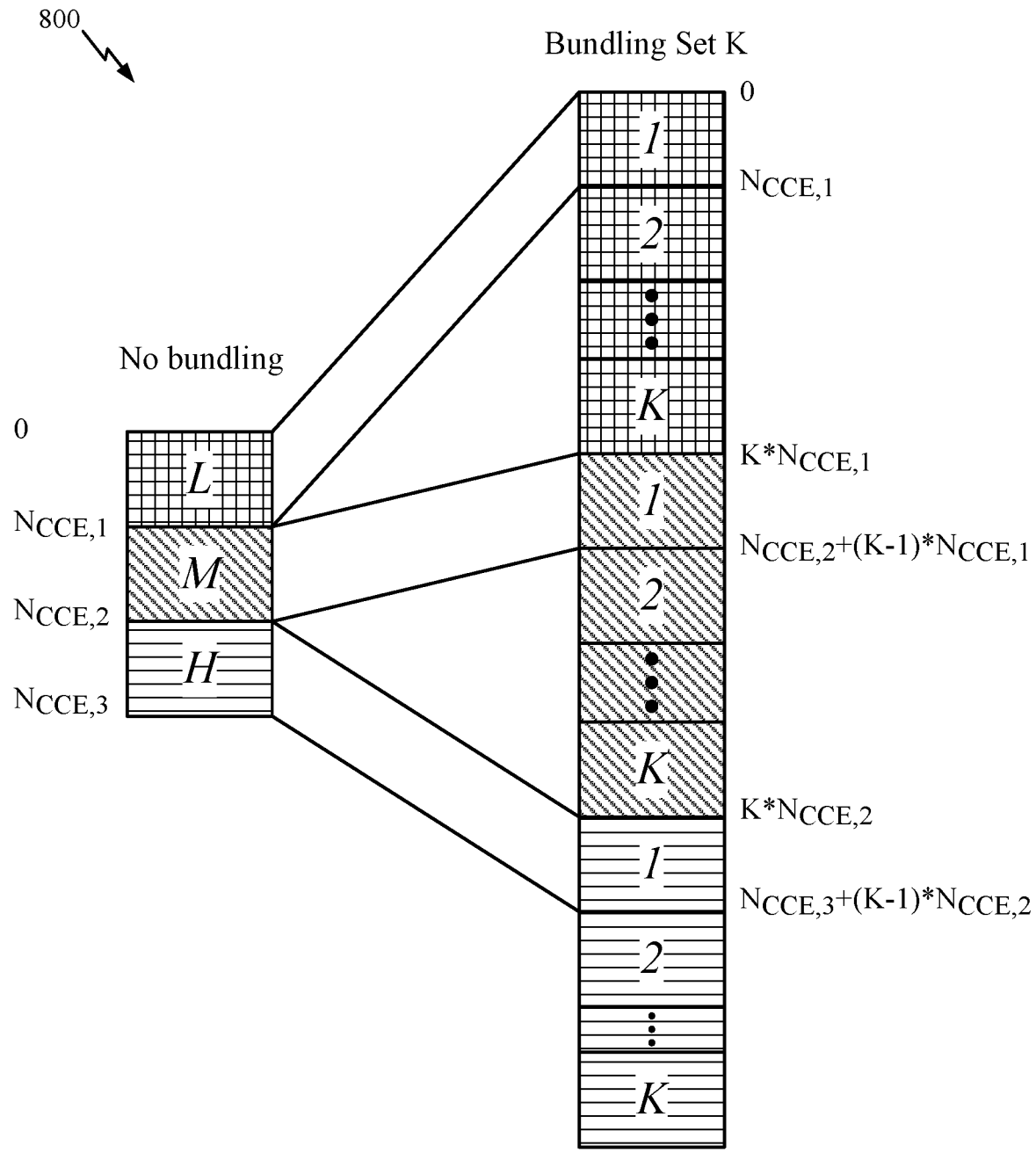
FIG. 8 illustrates example uplink control channel resource allocation, according to aspects of the present disclosure.

FIG. 7 illustrates example DL association sets. Different resource allocation for single and bundled subframes is illustrated in FIG. 8.

Various issues may arise in systems that dynamically switch subframe configurations, even in cases where reference configuration-based DL HARQ is used. For example, an excessive PUCCH region may be reserved if PUCCH resource allocation is based on the reference configuration. For example, if configuration #5 is used as the reference, then the PUCCH resource region may need to be reserved for a total of 9 DL subframes.

Another issue is that the HARQ-ACK codebook size may also be too large for eIMTA UEs (e.g., UEs that support dynamic subframe configuration switching) if the codebook size is also determined by the reference configuration. For three types of ACK/NACK transmission (e.g., bundling, multiplexing on PUCCH format 1b with channel selection, and PUCCH format 3), the codebook size may be determined by three different techniques (e.g., the bundling size (time domain), the ACK/NACK mapping table, and the payload size of format 3, respectively).

Another issues it that the PUCCH resource taken by an eIMTA UE may collide with that of the legacy UE if the reference configuration is different from the SIB1 UL-DL configuration which is followed by the legacy UE (e.g., a UE that does not support dynamic subframe configuration switching).

Figure 9A:
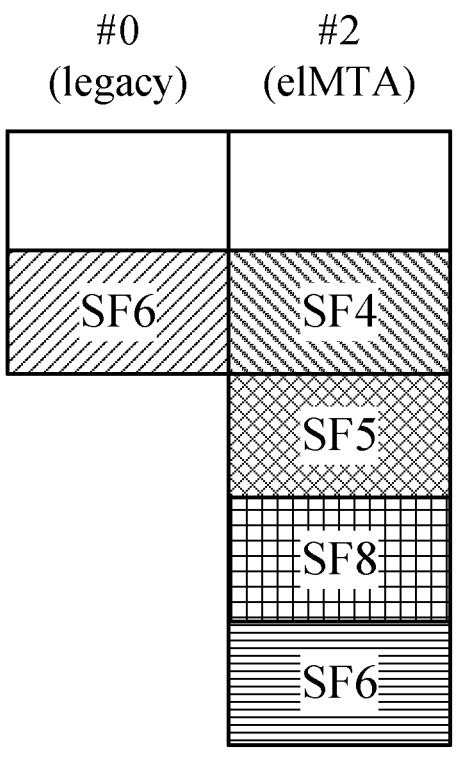
FIGS. 9A and 9B illustrate example collisions between uplink resources of different UEs, according to aspects of the present disclosure.

FIG. 9A illustrates a first case (Case 1) where a same first CCE index is present in different subframes, resulting in a collision. The example assumes a legacy UE operating with SIB1 UL-DL configuration #0, that reference configuration #2 is used for an eIMTA UE, and that the PDCCH in DL SF6 for a legacy UE and PDCCH in DL SF4 for an eIMTA UE can map to the same PUCCH resources.

Figure 9B:
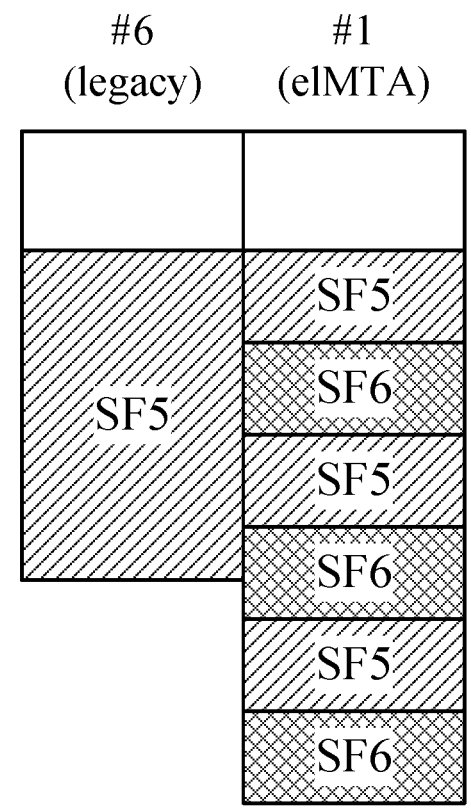

FIG. 9B illustrates a second case (Case 2), in which different first CCE indices in different subframes result in a collision. This example assumes that the SIB-1 UL-DL configuration is #6 and #1 is used as the reference configuration. The implicit PUCCH resource allocation for DL SF5 for a legacy UE and for DL SF6 for an eIMTA UE may still collide due to the different sizes of the bundling set.

Example Hybrid Reference and Dynamic Configuration

Aspects of the present disclosure provide for a "hybrid" design, based on both reference and dynamic configurations. For example, for PDSCH HARQ-ACK feedback, the HARQ timing may be based on the reference configuration (e.g. the subframe to transmit PDSCH HARQ-ACK may be determined from the reference configuration). However, the HARQ-ACK codebook size and the PUCCH resource allocation may be determined by the dynamic TDD UL-DL configuration (e.g., based on the dynamic L1 signaling of reconfiguration). Advantages of this hybrid approach may include more efficient HARQ-ACK feedback and low PUCCH resource overhead. In some cases, it may also be straightforward to support a fallback solution, for example, in case of missing dynamic reconfiguration signaling or decoding attempt failure. In such case, the SIB1 UL-DL configuration may be used for determining the HARQ-ACK codebook size and PUCCH resource allocation.

In some cases, the codebook size or number of ACK/NACK bits may be determined based on the actual size of the DL association set size M as determined from a dynamic UL-DL configuration and DL transmission mode as well as a number of carriers for carrier aggregation case. This may mean that for ACK/NAK bundling-based PUCCH transmission, there may be less time-domain bundling. For ACK/NAK multiplexing on PUCCH format 1b with channel selection, this may mean that a smaller sized mapping table can be used. For ACK/NACK PUCCH format 3, this may entail a reduced payload size and a lower likelihood of using dual RM coding (which is less efficient than single RM) and invoking spatial bundling (which may happen when the ACK/NAK payload size is >20).

According to certain aspects, PUCCH resource mapping may be determined based on the dynamic subframe configuration. For example, eIMTA UEs may determine the PUCCH resource allocation based on the size of DL association set M of the dynamically indicated UL-DL configuration. More precisely, the flexible subframe in the bundling set that is not configured as a DL subframe by dynamic reconfiguration signaling may not be counted, while the remaining DL subframes may be used to determine the association set size M. The packing order of the remaining DL subframes in the bundling set may also be changed by removing the UL subframes.

As an example, if reference configuration #4 is used for DL HARQ timing, the HARQ-ACK of DL subframes 4, 5, 8 and 6 are mapped into uplink SF2. If the dynamic configuration is #3, SF4 is a UL subframe and implicit PUCCH resources may be reserved only for subframes 5, 8 and 6, which may have an updated packing order of {0, 1, 2} instead of {2, 3, 4}. In addition, the packing order of the remaining DL subframes may also be reordered, for example, with the fixed DL subframes always mapped as first. The reordering may be applied to share PUCCH resource between legacy and eIMTA UE. FIG. 10 illustrates an example of DL subframe bundling sets for different reference and candidate UL-DL configurations. Such dynamic DL association set based PUCCH resource mapping may greatly improve PUCCH resource utilization.

In some cases, separate PUCCH resource regions may be configured for eIMTA and legacy UEs to avoid collision, the configuration (another $N_{PUCCH}^{(1)}$) may be via higher layer signaling. However, if a eIMTA UE detects no collision with a legacy UE PUCCH region, a default $N_{PUCCH}^{(1)}$ used by the legacy UE may also be used by the eIMTA UE. For example, based on the actual subframe configuration used by the legacy UE and the dynamic subframe configuration, the eIMTA UE may determine that in an UL subframe, if the DL association set associated with the UL subframe for the legacy and dynamically indicated configurations are the same, the UE may use a first offset (e.g., the same as the legacy UE). Otherwise, the eIMTA may use a second offset. As noted above, in case of a missing dynamic reconfiguration signaling (or failed decoding attempt), the first offset may be used as a fallback.

In some cases a dynamic selection of $N_{PUCCH}^{(1)}$ may also be indicated by an eNB via explicit signaling. For example, en eNB may reuse transmit power control (TPC) command bits in DCI formats (e.g., 1A/1B/1D/1/2A/2/2B/2C/2D) transmitted in the common DL subframes of a bundling set. In such a case, PUCCH power control for eIMTA UEs may be based on a TPC command indicated in other DL subframes in the bundling set or via group power control (e.g., using DCI format 3/3A). As another option, a TPC command in the common DL subframe can be used as a HARQ-ACK resource offset (ARO). Such ARO values may be subframe dependent. For example, depending on the location of a subframe within the set of M subframes, the ARO values may be different. The usage of TPC commands (in the manners described above) may be configured by higher layer signaling on a per eIMTA UE basis.

Example of subframe dependent ARO values may be based on the idea that since CCE indexing is block based, and depends on the value of M, the difference between legacy and new UEs may also be subframe dependent. As an example, assuming a legacy UE sees M=2, two control symbols in each subframe, each with 10 CCEs, the CCE indexing may be:

First subframe, first symbol: 0-9
Second subframe, first symbol: 10-19
First subframe, second symbol: 20-29
Second subframe, second symbol: 30-39

New UEs may see M=3, still 2 control symbols per subframe, and 10 CCEs per subframe. The CCE indexing may be:

First subframe, first symbol: 0-9
Second subframe, first symbol: 10-19
Third subframe, first symbol: 20-29
First subframe, second symbol: 30-39
Second subframe, second symbol: 40-49
Third subframe, second symbol: 50-59

As a result, for new UEs, for the first subframe, the ARO values can be either 0, or −10; for the second subframe, the ARO values can be 0, and −10; for the 3rd subframe, it can be +20 and 0. It may also be noted that the order of the subframes in the set M1 for legacy and M2 for new UEs can be different. In that case, the ARO values may be designed to take that into account.

The resource mapping techniques described above for PDCH monitoring subframes may also be applied to enhanced PDCCHs (EPDCCHs). In addition, in EPDCCH subframes, the PUCCH resource may be further adjusted by the ARO field for collision avoidance. In some cases, some form of ARO resource compression may be used to reduce PUCCH overhead. For example, the ARO field may be used to dynamically indicate PUCCH resource start offset $N_{PUCCH}^{(1)}$.

Figure 11:
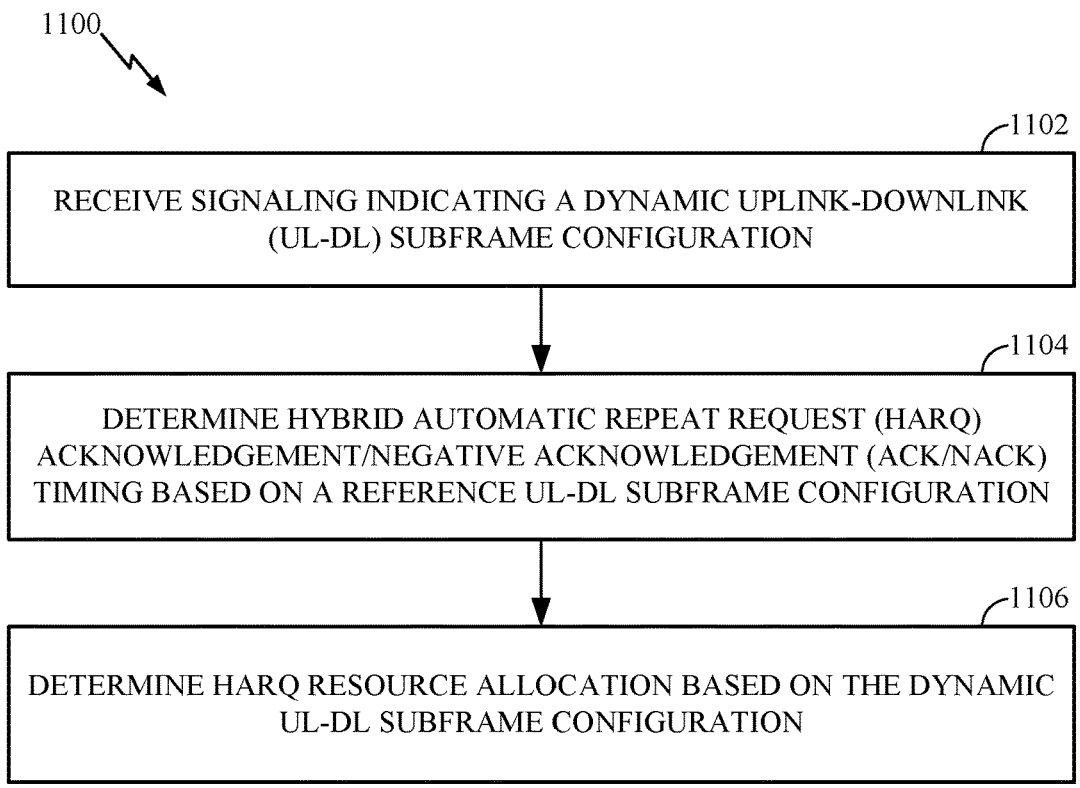
FIG. 11 illustrates example operations that may be performed by a user equipment (UE), according to aspects of the present disclosure.

FIG. 11 illustrates example operations 1100 for wireless communications that may be performed by a user equipment (UE), in accordance with aspects of the present disclosure. The operations 1100 may be performed, for example, by an eIMTA UE capable of supporting dynamic subframe configuration.

The operations 1100 begin, at 1102, by receiving signaling indicating a dynamic uplink-downlink (UL-DL) subframe configuration. At 1104, the UE may determine hybrid automatic repeat request (HARQ) acknowledgement/negative acknowledgement (ACK/NACK) timing based on a reference UL-DL subframe configuration. At 1106, the UE may determine HARQ resource allocation based on the dynamic UL-DL subframe configuration.

Figure 12:
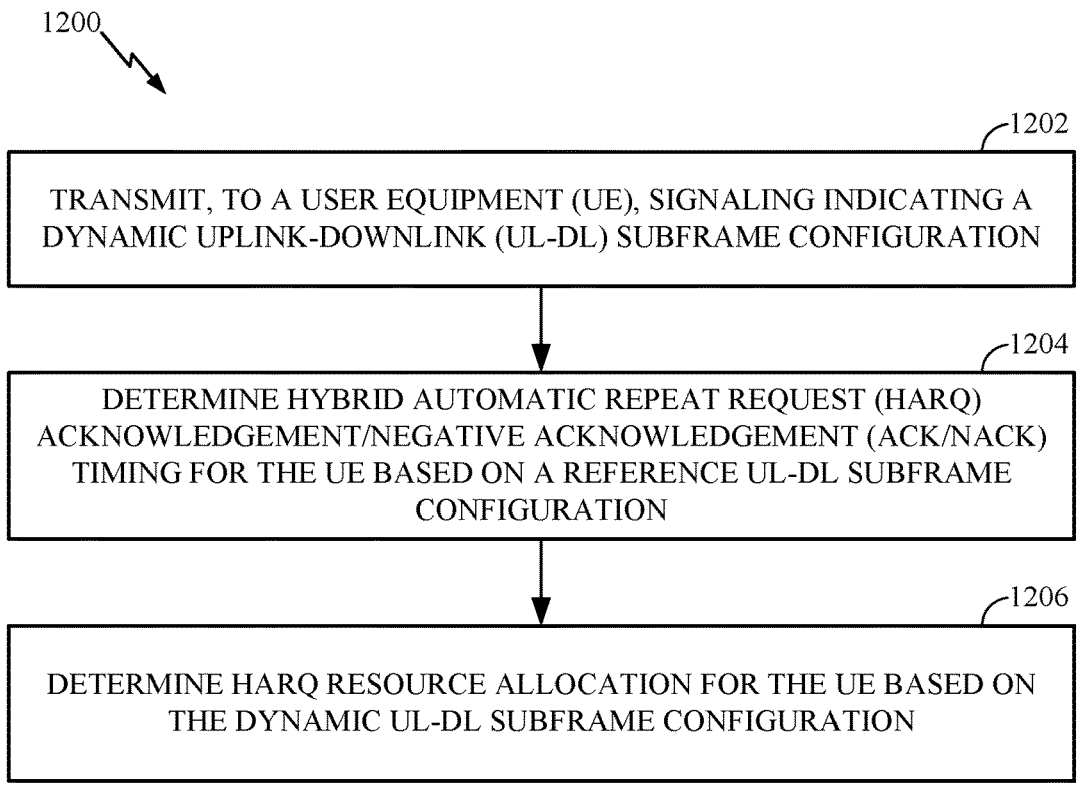
FIG. 12 illustrates example operations that may be performed by a base station, according to aspects of the present disclosure.

FIG. 12 illustrates example operations 1200 for wireless communications that may be performed by a base station (BS), in accordance with aspects of the present disclosure.

The operations 1200 begin, at 1202, by transmitting, to a user equipment (UE), signaling indicating a dynamic uplink-downlink (UL-DL) subframe configuration. At 1204, the BS may determine a hybrid automatic repeat request (HARQ) acknowledgement/negative acknowledgement (ACK/NACK) timing for the UE based on a reference UL-DL subframe configuration. At 1206, the BS may determine HARQ resource allocation for the UE based on the dynamic UL-DL subframe configuration.

As noted above, the signaling indicating the dynamic UL-DL subframe configuration may comprise L1 signaling.

In some cases, determining HARQ ACK/NACK timing based on the reference UL-DL subframe configuration may include determining a subframe in which to transmit a HARQ ACK/NACK based on the reference UL-DL subframe.

In some cases, determining HARQ resource allocation based on the dynamic UL-DL subframe configuration may include determining a HARQ-ACK codebook size based on the dynamic UL-DL subframe configuration. In some cases, at least one of the codebook size or a number of ACK/NACK bits may be determined based on a size of a DL association set of the dynamic UL-DL configuration. For example, the size of the DL association set may be determined from at least one of a DL transmission mode or a number of carriers if carrier aggregation is utilized.

In some cases, determining HARQ resource allocation based on the dynamic UL-DL subframe configuration may include determining physical uplink control channel (PUCCH) resource allocation based on the dynamic UL-DL subframe configuration. For example, the physical uplink control channel (PUCCH) resource allocation may be determined based on a size of a DL association set of the dynamic UL-DL configuration. For example, flexible subframes in a bundling set not configured as DL in the dynamic UL-DL configuration may not be counted when determining the size of the DL association set. A packing order of remaining DL subframes in the bundling set may be determined by removing UL subframes. In some cases, fixed DL subframes may be mapped first in the packing order of the remaining DL subframes.

In some cases, separate PUCCH regions may be configured for UEs capable of supporting dynamic UL-DL configuration and legacy UEs not capable of supporting dynamic UL-DL configuration. In some cases, a determination may be made whether a potential collision exists with the legacy UE PUCCH region. An eIMTA UE may be configured to use the legacy PUCCH region if no potential collision is detected. An eIMTA UE may be configured to select a first offset value if no potential collision is detected and a second offset value if a potential collision is detected.

In some cases, PUCCH resource allocation is determined, at least in part, based on dynamic signaling. The dynamic signaling may be conveyed via one or more bits in a downlink control information (DCI) format used for transmit power control (TPC) commands. In some cases, the dynamic signaling is conveyed via one or more HARQ acknowledgement resource offset (ARO) bits.

As described above, a fallback operation may be supported. For example, by detecting a missed dynamic UL-DL subframe configuration and, in response to the detection, determining HARQ resource allocation based on an UL-DL subframe configuration signaled in a system information block (SIB).

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communication by a user equipment (UE), comprising:
   receiving signaling indicating a dynamic uplink-downlink (UL-DL) subframe configuration;
   determining hybrid automatic repeat request (HARQ) acknowledgement/negative acknowledgement (ACK/NACK) timing based on the dynamic UL-DL subframe configuration and a resource offset, wherein the dynamic UL-DL subframe configuration includes a plurality of consecutive UL subframes, and wherein determining the HARQ ACK/NACK timing comprises determining a subframe in which to transmit the HARQ ACK/NACK based on a number of the plurality of consecutive UL subframes in the dynamic UL-DL subframe configuration;
   determining HARQ resource allocation for a physical uplink control channel (PUCCH) based on the dynamic UL-DL subframe configuration, wherein the HARQ resource allocation comprises an allocation of frequency resources on which the PUCCH is to be transmitted; and
   transmitting a HARQ ACK/NACK on the PUCCH based on the determined HARQ resource allocation and HARQ ACK/NACK timing.

2. The method of claim 1, wherein determining HARQ resource allocation based on the dynamic UL-DL subframe configuration comprises determining a HARQ-ACK codebook size based on the dynamic UL-DL subframe configuration.

3. The method of claim 2, wherein at least one of the codebook size or a number of ACK/NACK bits is determined based on a size of a DL association set of the dynamic UL-DL subframe configuration.

4. The method of claim 1, wherein determining HARQ resource allocation based on the dynamic UL-DL subframe configuration comprises determining physical uplink control channel (PUCCH) resource allocation based on the dynamic UL-DL subframe configuration.

5. The method of claim 4, wherein the physical uplink control channel (PUCCH) resource allocation is determined based on a size of a DL association set of the dynamic UL-DL subframe configuration.

6. The method of claim 5, wherein flexible subframes in a bundling set not configured as DL in the dynamic UL-DL configuration are not counted when determining the size of the DL association set.

7. The method of claim 6, further comprising determining a packing order of remaining DL subframes in the bundling set by removing UL subframes.

8. The method of claim 7, wherein fixed DL subframes are mapped first in the packing order of the remaining DL subframes.

9. The method of claim 4, wherein separate PUCCH regions are configured for UEs capable of supporting dynamic UL-DL subframe configuration and UEs not capable of supporting dynamic UL-DL subframe configuration.

10. The method of claim 9, further comprising determining whether a potential collision exists between the PUCCH region for UEs capable of dynamic UL-DL subframe configuration and the PUCCH region for UEs not capable of supporting dynamic UL-DL subframe configuration.

11. The method of claim 10, further comprising:
    using the PUCCH region for UEs not capable of supporting dynamic UL-DL subframe configuration if no potential collision is detected.

12. The method of claim 10, wherein the resource offset comprises:
a first offset value if no potential collision is detected; and
a second offset value if a potential collision is detected.

13. The method of claim 4, wherein the signaling indicating a dynamic uplink-downlink (UL-DL) subframe configuration comprises dynamic signaling.

14. The method of claim 13, wherein the dynamic signaling is conveyed via at least one of:
one or more bits in a downlink control information (DCI) format used for transmit power control (TPC) commands, or
one or more acknowledgement resource offset (ARO) bits.

15. The method of claim 1, further comprising:
detecting a missed dynamic UL-DL subframe configuration; and
in response to the detection, determining HARQ resource allocation based on an UL-DL subframe configuration signaled in a system information block (SIB).

16. An apparatus for wireless communications, comprising:
means for receiving signaling indicating a dynamic uplink-downlink (UL-DL) subframe configuration;
means for determining hybrid automatic repeat request (HARQ) acknowledgement/negative acknowledgement (ACK/NACK) timing based on the dynamic UL-DL subframe configuration and a resource offset, wherein the dynamic UL-DL subframe configuration includes a plurality of consecutive UL subframes, and wherein determining the HARQ ACK/NACK timing comprises determining a subframe in which to transmit the HARQ ACK/NACK based on a number of the plurality of consecutive UL subframes in the dynamic UL-DL subframe configuration;
means for determining HARQ resource allocation for a physical uplink control channel (PUCCH) based on the dynamic UL-DL subframe configuration, wherein the HARQ resource allocation comprises an allocation of frequency resources on which the PUCCH is to be transmitted; and
means for transmitting a HARQ ACK/NACK on the PUCCH based on the determined HARQ resource allocation and HARQ ACK/NACK timing.

17. The apparatus of claim 16, wherein determining HARQ resource allocation based on the dynamic UL-DL subframe configuration comprises determining a HARQ-ACK codebook size based on the dynamic UL-DL subframe configuration.

18. The apparatus of claim 16, wherein determining HARQ resource allocation based on the dynamic UL-DL subframe configuration comprises determining physical uplink control channel (PUCCH) resource allocation based on the dynamic UL-DL subframe configuration.

19. The apparatus of claim 18, wherein the physical uplink control channel (PUCCH) resource allocation is determined based on a size of a DL association set of the dynamic UL-DL subframe configuration, wherein flexible subframes in a bundling set not configured as DL in the dynamic UL-DL configuration are not counted when determining the size of the DL association set, and wherein the apparatus further comprises means for determining a packing order of remaining DL subframes in the bundling set by removing UL subframes.

20. The apparatus of claim 18, wherein separate PUCCH regions are configured for UEs capable of supporting dynamic UL-DL subframe configuration and UEs not capable of supporting dynamic UL-DL subframe configuration, and wherein the apparatus further comprises means for determining whether a potential collision exists between the PUCCH region for UEs capable of dynamic UL-DL subframe configuration and the PUCCH region for UEs not capable of supporting dynamic UL-DL subframe configuration.

21. The apparatus of claim 20, wherein the resource offset comprises:
a first value if no potential collision is detected; and
a second offset value if a potential collision is detected.

22. The apparatus of claim 18, wherein the signaling indicating a dynamic uplink-downlink (UL-DL) subframe configuration comprises dynamic signaling, and wherein the dynamic signaling is conveyed via at least one of:
one or more bits in a downlink control information (DCI) format used for transmit power control (TPC) commands, or
one or more acknowledgment resource offset (ARO) bits.

23. The apparatus of claim 16, further comprising:
means for detecting a missed dynamic UL-DL subframe configuration; and
means for determining, in response to the detection, HARQ resource allocation based on an UL-DL subframe configuration signaled in a system information block (SIB).

24. An apparatus for wireless communications, comprising:
means for receiving signaling indicating a dynamic uplink-downlink (UL-DL) subframe configuration;
means for determining hybrid automatic repeat request (HARQ) acknowledgement/negative acknowledgement (ACK/NACK) timing based on the dynamic UL-DL subframe configuration, wherein the dynamic UL-DL subframe configuration includes a plurality of consecutive UL subframes, and wherein determining the HARQ ACK/NACK timing comprises determining a subframe in which to transmit the HARQ ACK/NACK based on a number of the plurality of consecutive UL subframes in the dynamic UL-DL subframe configuration;
means for determining HARQ resource allocation for a physical uplink control channel (PUCCH) based on the dynamic UL-DL subframe configuration, wherein separate PUCCH regions are configured for UEs capable of supporting dynamic UL-DL subframe configuration and UEs not capable of supporting dynamic UL-DL subframe configuration, and wherein the HARQ resource allocation comprises an allocation of frequency resources on which the PUCCH is to be transmitted;
means for determining whether a potential collision exists between the HARQ resource allocation and the PUCCH region for UEs not capable of supporting dynamic UL-DL subframe configuration;
means for using the PUCCH region for UEs not capable of supporting dynamic UL-DL subframe configuration for communications between the UE and a base station if no potential collision is determined; and
means for transmitting HARQ ACK/NACK on the PUCCH based on the HARQ ACK/NACK timing and HARQ resource allocation.

25. An apparatus for wireless communications, comprising:
means for transmitting, to a user equipment (UE), signaling indicating a dynamic uplink-downlink (UL-DL) subframe configuration;

means for determining hybrid automatic repeat request (HARQ) acknowledgement/negative acknowledgement (ACK/NACK) timing for the UE based on the dynamic UL-DL subframe configuration, wherein the dynamic UL-DL subframe configuration includes a plurality of consecutive UL subframes, and wherein determining the HARQ ACK/NACK timing comprises determining a subframe in which to transmit the HARQ ACK/NACK based on a number of the plurality of consecutive UL subframes in the dynamic UL-DL subframe configuration;

means for determining HARQ resource allocation for a physical uplink control channel for the UE based on the dynamic UL-DL subframe configuration, wherein separate PUCCH regions are configured for UEs capable of supporting dynamic UL-DL subframe configuration and UEs not capable of supporting dynamic UL-DL subframe configuration, and wherein the HARQ resource allocation comprises an allocation of frequency resources on which the PUCCH is to be transmitted;

means for determining whether a potential collision exists between the determined HARQ resource allocation and the PUCCH region for UEs not capable of supporting dynamic UL-DL subframe configuration, wherein the PUCCH region for UEs not capable of supporting dynamic UL-DL subframe configuration is used for communications between the BS and both UEs not capable of supporting dynamic UL-DL subframe configuration and UEs capable of supporting dynamic UL-DL subframe configuration if no potential collision is determined; and means for receiving HARQ ACK/NACK on the PUCCH from the UE based on the determined HARQ resource allocation and HARQ ACK/NACK timing.

* * * * *